United States Patent [19]
Ben-Dov et al.

[11] Patent Number: 6,163,640
[45] Date of Patent: Dec. 19, 2000

[54] STEREOSCOPIC SENSOR

[75] Inventors: Shimshon Ben-Dov, Yokneam; Igal Lanzet, K. Bialik; Igor Kuperman, Yokneam, all of Israel

[73] Assignee: Metroptic Technologies, Inc., Yokneam, Israel

[21] Appl. No.: 09/323,432

[22] Filed: Jun. 1, 1999

Related U.S. Application Data

[60] Provisional application No. 60/087,460, Jun. 1, 1998.

[51] Int. Cl.[7] ....................................................... G02B 6/04
[52] U.S. Cl. ............................................ 385/115; 600/113
[58] Field of Search ..................................... 385/115, 116, 385/117, 118, 147; 600/146, 173, 113, 167

[56] References Cited

U.S. PATENT DOCUMENTS

| 5,003,385 | 3/1991 | Sudo | 358/88 |
|---|---|---|---|
| 5,059,009 | 10/1991 | McKinley | 359/435 |
| 5,097,359 | 3/1992 | McKinley | 359/435 |
| 5,122,650 | 6/1992 | McKinley | 250/208 |
| 5,222,477 | 6/1993 | Lia | 128/6 |
| 5,613,936 | 3/1997 | Czarnek et al. | 600/166 |
| 5,759,044 | 6/1998 | Redmond | 434/307 R |
| 5,895,350 | 5/2000 | Hori | 600/167 |
| 5,901,261 | 5/1999 | Wach | 385/38 |
| 6,066,090 | 5/2000 | Yoon | 600/113 |

*Primary Examiner*—Akm E. Ullah
*Attorney, Agent, or Firm*—Wolf, Greenfield & Sacks, P.C.

[57] ABSTRACT

The present invention includes a stereoscopic fiber optic probe sensor. In one aspect of the invention, the fiber stereoscopic optic probe includes a signal fiber bundle having a plurality of first signal fibers, and an illumination fiber bundle having a plurality of second signal fibers. A drawn fiber optic bundle is contiguous with and formed by a predetermined length of the signal fiber bundle and the illumination fiber bundle. The drawn fiber optic bundle comprises portions of the first and second signal fibers. A plurality of fiber tips terminate the drawn fiber optic bundle. Each fiber tip provides one or more surfaces at which the first signal fibers are terminated and one or more surfaces at which the second signal fibers are terminated. In one embodiment, the sensor includes an imaging sensor. The sensor is operatively coupled to an end of the signal fiber bundle opposite the drawn fiber optic bundle. Generally, the imaging sensor is constructed and arranged to receive light reflected into the terminal end of the signal fiber bundle at the fiber tip. In another embodiment, the sensor includes an illumination source operatively coupled to an end of the illumination fiber bundle opposite the drawn fiber optic bundle. The illumination source is constructed and arranged to project light into the end of the illumination fiber bundle for transport through the illumination fiber bundle and the drawn fiber optic bundle to the one or more surfaces at which the second signal fibers are terminated. The imaging sensor may be, for example, a CCD array, CID array or CMOS imaging sensor. Advantageously, the stereoscopic probe provides a large depth of focus and a real, non-inverted, distortion free image. Further features and advantages of the present invention as well as the structure and operation of various embodiments of the present invention are described in detail below with reference to the accompanying drawings. In the drawings, like reference numerals indicate like or functionally similar elements or method steps. Additionally, the left-most one or two digits of a reference numeral identifies the drawing in which the reference numeral first appears.

6 Claims, 3 Drawing Sheets

STEREOSCOPIC SENSOR

RELATED APPLICATIONS

This application claims the benefit of U.S. Provisional Application No. 60/087,460 filed Jun. 1, 1998, entitled "Stereoscopic Sensor" and naming as inventors Shimshon, Ben-Dov, Igal Lanzet, and Igor Kuperman.

BACKGROUND OF THE INVENTION

1. Field of the Invention

The present invention relates generally to fiber optics and, more particularly, to fiber optic probes.

2. Related Art

A conventional fiber optic bundle typically includes millions of individual fibers of glass which are manufactured by pouring pure raw glass having a high index of refraction into a tube having a cladding glass with a lower index of refraction. The glass and the tube are then precisely aligned and fused together to form a solid fiber glass bundle. Each fiber in the bundle receives and carries a small portion of an image by a well-known process of internally reflecting light rays emanating from the image. Through this process, high resolution images may be efficiently transferred from one surface to another.

Oftentimes, light received at one end of the fiber is transferred to the output end and projected onto a self scanned array, such as a charge coupled device ("CCD"), to convert the light level in a group of fibers of "pixels" to a corresponding electrical signal which can be digitized and reconstructed graphically as an intensified image on a computer screen.

SUMMARY OF THE INVENTION

The present invention includes a stereoscopic fiber optic probe sensor. In one aspect of the invention, the fiber stereoscopic optic probe includes a signal fiber bundle having a plurality of first signal fibers, and an illumination fiber bundle having a plurality of second signal fibers. A drawn fiber optic bundle is contiguous with and formed by a predetermined length of the signal fiber bundle and the illumination fiber bundle. The drawn fiber optic bundle comprises portions of the first and second signal fibers. A plurality of fiber tips terminate the drawn fiber optic bundle. Each fiber tip provides one or more surfaces at which the first signal fibers are terminated and one or more surfaces at which the second signal fibers are terminated.

In one embodiment, the sensor includes an imaging sensor. The sensor is operatively coupled to an end of the signal fiber bundle opposite the drawn fiber optic bundle. Generally, the imaging sensor is constructed and arranged to receive light reflected into the terminal end of the signal fiber bundle at the fiber tip. In another embodiment, the sensor includes an illumination source operatively coupled to an end of the illumination fiber bundle opposite the drawn fiber optic bundle. The illumination source is constructed and arranged to project light into the end of the illumination fiber bundle for transport through the illumination fiber bundle and the drawn fiber optic bundle to the one or more surfaces at which the second signal fibers are terminated. The imaging sensor may be, for example, a CCD array, CID array or CMOS imaging sensor.

Advantageously, the stereoscopic probe provides a large depth of focus and a real, non-inverted, distortion free image.

Further features and advantages of the present invention as well as the structure and operation of various embodiments of the present invention are described in detail below with reference to the accompanying drawings. In the drawings, like reference numerals indicate like or functionally similar elements or method steps. Additionally, the left-most one or two digits of a reference numeral identifies the drawing in which the reference numeral first appears.

BRIEF DESCRIPTION OF THE DRAWINGS

The foregoing, and other objects and advantages, will be understood more clearly from the following detailed description and from the accompanying figures. This description is given by way of example only and in no way restricts the scope of the invention. In the figures.

DETAILED DESCRIPTION

Figure 1:
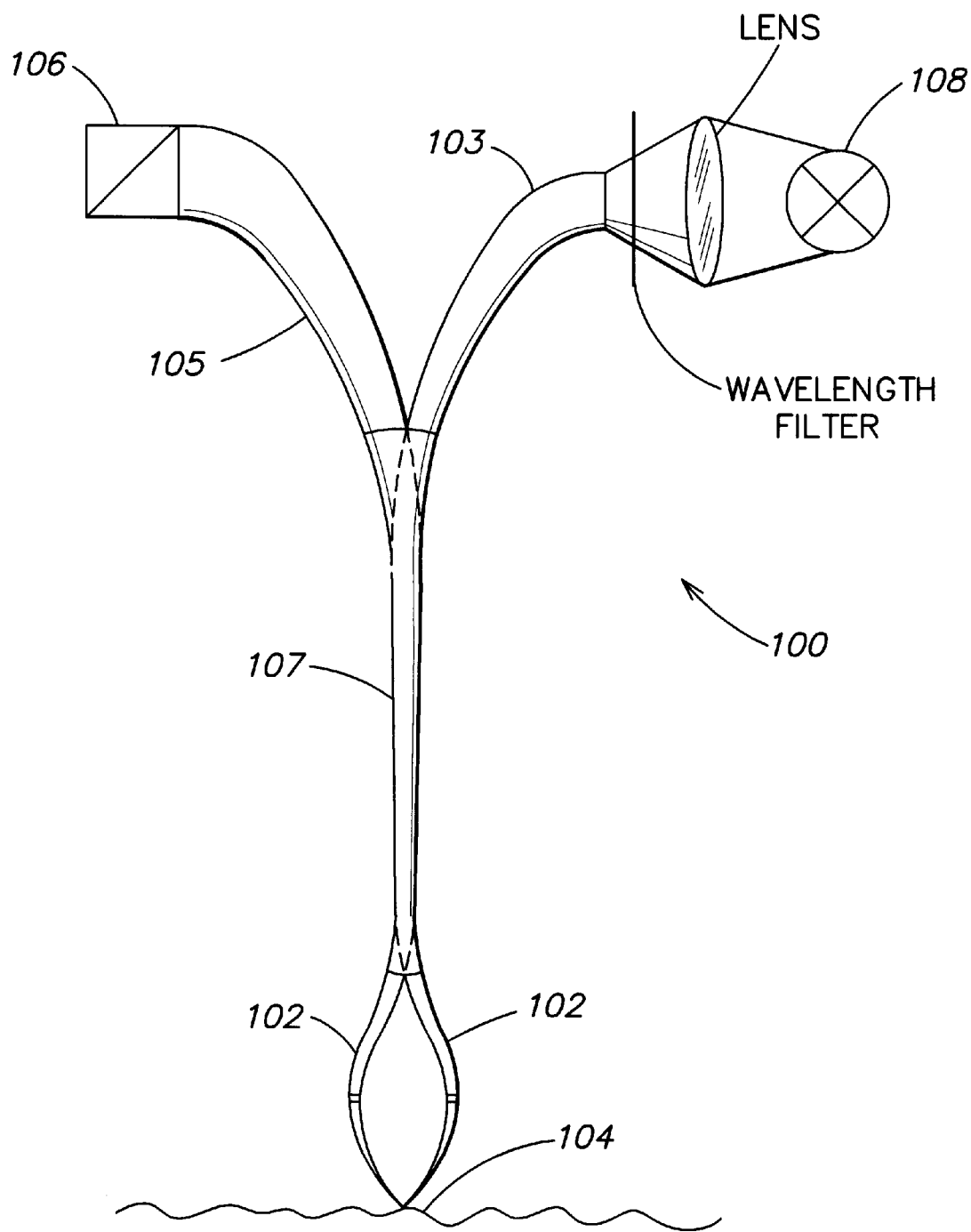
FIG. 1 is a perspective view of one embodiment of the stereoscopic probe of the present invention.

One embodiment of the stereoscopic sensor of the present invention is illustrated in FIG. 1. The stereoscopic probe 100 provides two or more self focusing fiber optic tips 102, each illuminating and receiving images of the object to be measured 104 from different perspectives or directions.

In the illustrative embodiment, two fiber optic bundles are combined with each other at a predetermined portion along their length to form a single drawn fiber optic bundle 107. The two fiber optic bundles, referred to as an illuminating fiber bundle 103 and a signal fiber bundle 105, are preferably combined to form a random distribution in the combined fiber bundle 107.

The illuminating fiber bundle 103 is connected to an illuminating source 108. The illumination fiber bundle 103 carries light from the illuminating source 108 to the fiber tips 102. The signal fiber bundle 105 is connected to a imaging sensor 106 such as the illustrated CCD or CID array, although other sensors may be used, such as a CMOS imaging sensor. The signal fiber bundle 105 carries the light reflected from the surface of the object being measured 104 to the sensor 106.

Figure 2:
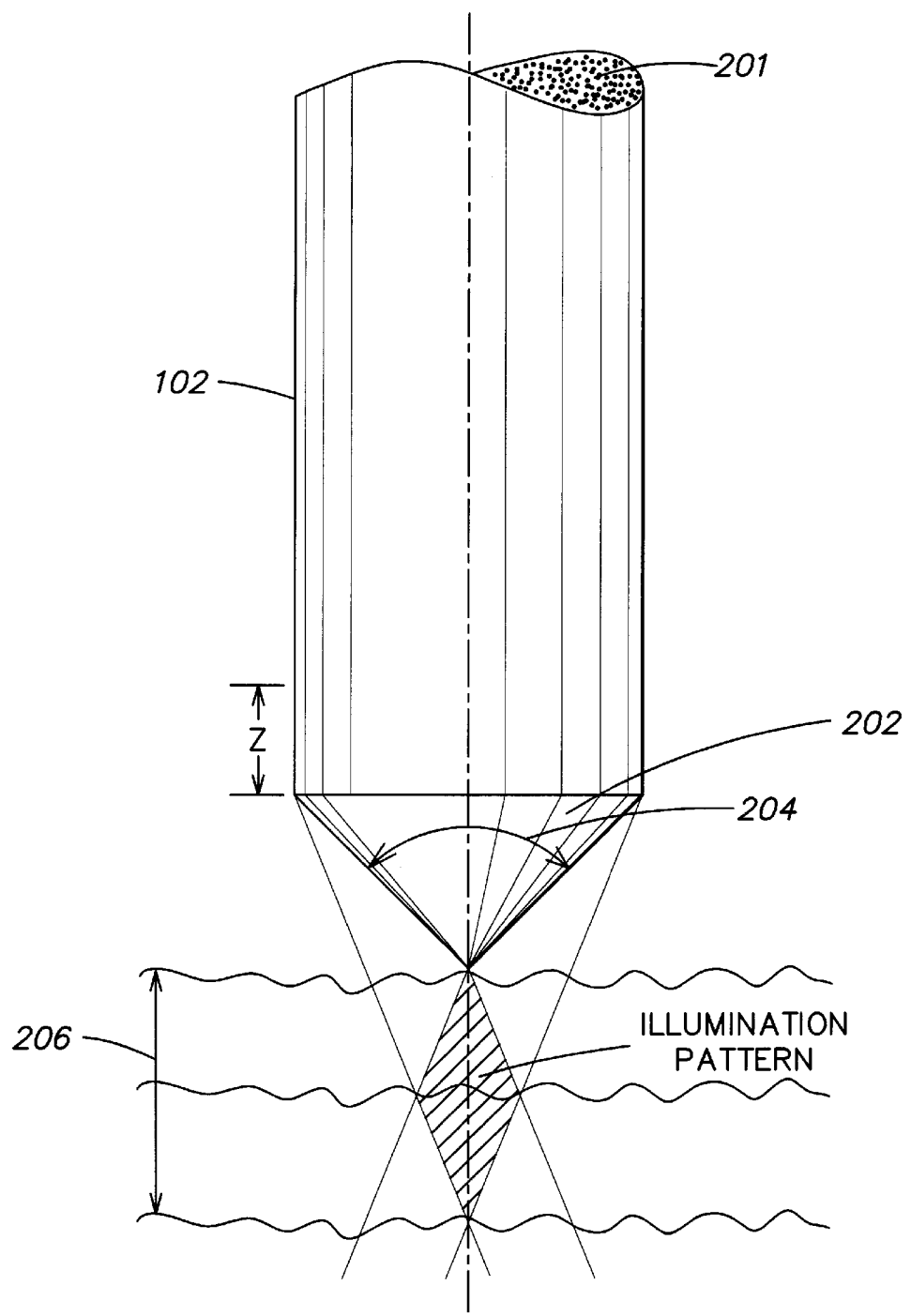
FIG. 2 is a perspective view of one embodiment of the fiber optic tips illustrated in FIG. 1 with a cone-shaped configuration.

FIG. 2 is a perspective view of one embodiment of the fiber bundle tips 102 having a cone-shaped configuration. In one embodiment, the fiber tip 102s each have a diameter of approximately 2 mm and contains approximately 400,000 fibers 201. It should be understood however, than any number of fibers and any size fibers appropriate for a particular application can be used. A portion of the fibers 201 are dedicated to the signal fiber bundle 104 and a portion is dedicated to the illumination fiber bundle 103. In one embodiment, the fiber tips 102 have approximately 260,000 signal optical fibers and 140,000 illuminating optical fibers. Other arrangements are considered within the scope of the present invention.

In the embodiment illustrated in FIG. 2, the fiber tips 102 are cemented and ground to form a cone with an apex angle 204 selected to achieve a specific optical performance requirement. The sensor 106 preferably has a continuous response region and, accordingly, provides information pertaining to the surface inclination of the object being measured. It should be apparent to those skilled in the relevant art that the sensor operating range 206, working distance, and size of the fiber optic probe tip 102 can be adjusted as required.

Preferably, the fiber bundles 201 are non-coherent, although coherent fiber bundles are implemented in alternative embodiments. If non-coherent, performance of a known calibration procedure may be used to decode the address sequence for the signal fibers, which may be stored in a memory device. In one preferred embodiment, the calibration is performed by placing a reflecting surface within the sensor's operating range and recording the fiber illumination pattern. By displacing the surface of the object by a known amount, the corresponding illumination patterns can be recorded though the sensor range 206. Similar calibration can be carried out for different surfaces as necessary. Other calibration procedures may also be used.

In one embodiment, the fiber tips 102 has a diameter of approximately 2 mm and contains approximately 400,000 fibers. It should be understood however, than any number of fibers and any size fibers appropriate for a particular application can be used. A portion of the fibers in each fiber tip 102 is dedicated to the signal fiber bundle 105 while a portion is dedicated to the illumination fiber bundle 103. In one embodiment, the fiber tips 102 have approximately 260,000 signal optical fibers and 140,000 illuminating optical fibers. Other arrangements may also be used.

The fiber tips 102 are arranged about a predetermined surface of the object 104 to be measured so as to receive light reflected from the predetermined surface area from different perspectives relative to the surface. The surface of the object to be measured is illuminated by the light generated by the illumination source 108 and transmitted through the illumination fiber bundle 103 to each of the fiber tips 102. Likewise, and the light received by the self focusing fiber tips 102 is transmitted to the imaging sensor 106. The signal fiber bundles 105 from each of the probe tips 102 are preferably combined and cemented to the imaging sensor 106.

In alternative embodiments, additional fiber tips 102 may be used. For example, in one embodiment, 4 fiber tips are drawn from the combined fiber bundle 107. The four fiber tips are arranged in opposing orthogonal perspective relative to the surface area being measure. As one skilled in the art would find apparent, any number of fiber tips 102 may be used at any perspective relative to the object surface to accommodate the needs of a particular application.

Figure 3:
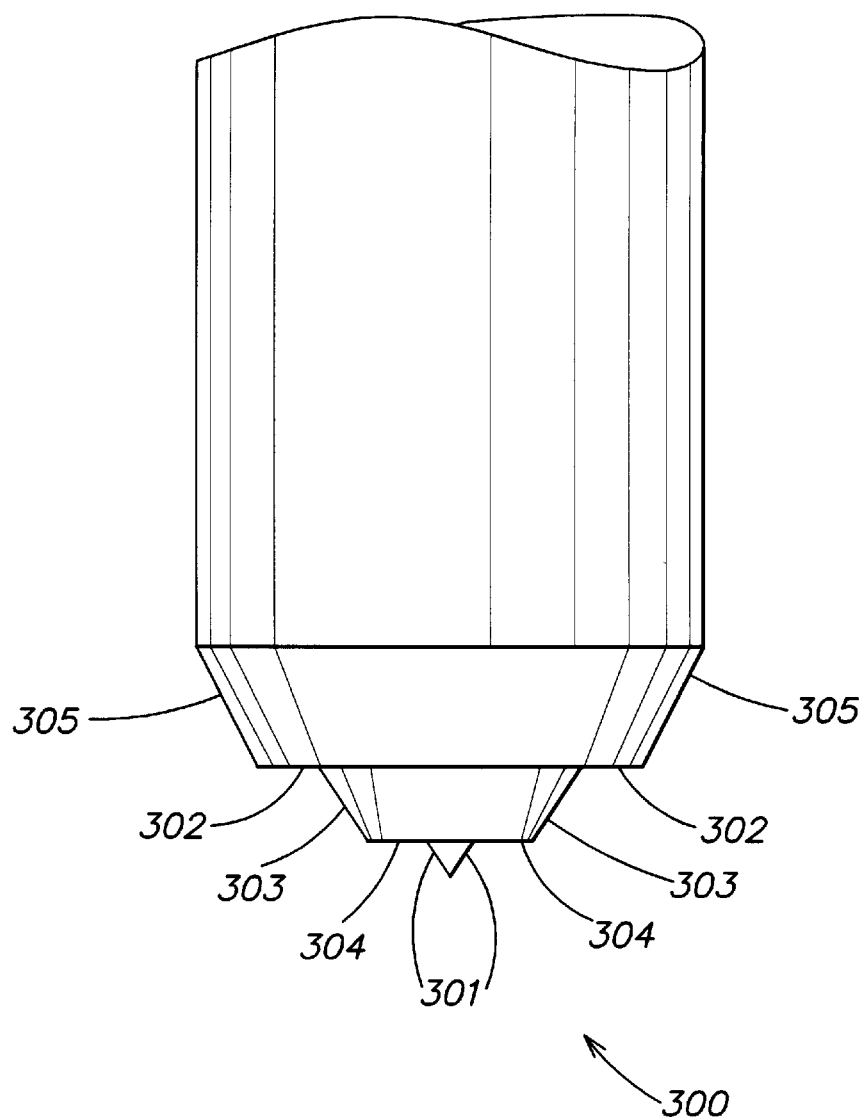
FIG. 3 is a schematic diagram of an alternative embodiment of the fiber optic tips having an configuration that provides various surfaces and surface angles from which to project and receive light.

FIG. 3 is a schematic diagram of an alternative embodiment of the fiber optic tips 102 of the present invention having an configuration that provides various surfaces and surface angles from which to project and receive light. In the exemplary configuration shown in FIG. 3, the fiber optic tip 300 includes substantially parallel surfaces 302 and 304 that subsequently for the illumination fiber bundle 103. Angled surfaces 301, 303 and 305 are the terminal end of the signal fiber bundle 104 to receive light reflected from a surface of the object to be measured. It should be apparent to those skilled in the art that the configuration of the fiber optic probe tip can take on any configuration. For example, more or less surfaces may be provided to either the signal fiber bundle 104 or the illumination fiber bundle 103. Furthermore, the angle of the surfaces may be selected to accommodate any application, light source, object surface, etc.

The following documents, which set forth various known techniques which may be used in conjunction with the teachings of the present invention are hereby incorporated by reference in their entirety: U.S. Pat. Nos. 5,613,936; 5.901,261; 5,735,792; 5,003,385; 5,059,009; 5,097,359; 5,122,650; 5,222,477; Welch Allyn Surgical Imaging Systems; and 3-D System With Two CCDs, Welch Allyn Surgical Imaging Systems. The inclusion of the relevant teachings of these documents into the stereoscopic probe of the present invention is considered to be within the scope of those of ordinary skill in the art.

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A stereoscopic fiber optic sensor comprising:
   a signal fiber bundle having a plurality of first signal fibers;
   an illumination fiber bundle having a plurality of second signal fibers;
   a drawn fiber optic bundle contiguous with said signal fiber bundle and said illumination fiber bundle and comprising said first and second signal fibers;
   a plurality of fiber tips terminating portions of said first and second signal fibers of said drawn fiber optic bundle, each said fiber tip having one or more surfaces at which said first signal fibers are terminated and one or more surfaces at which said second signal fibers are terminated.

2. The sensor of claim 1, further comprising:
   a imaging sensor operatively coupled to an end of said signal fiber bundle opposite said drawn fiber optic bundle, said imaging sensor constructed and arranged to receive light reflected into said terminal end of said signal fiber bundle at said fiber tip.

3. The sensor of claim 1, further comprising:
   an illumination source operatively coupled to an end of said illumination fiber bundle opposite said drawn fiber optic bundle, said illumination source constructed and arranged to project light into said end of said illumination fiber bundle for transport through said drawn fiber optic bundle to said one or more surfaces at which said second signal fibers are terminated.

4. The sensor of claim 1, wherein said imaging sensor is a CCD array.

5. The sensor of claim 1, wherein said imaging sensor is a CID array.

6. The sensor of claim 1, wherein said imaging sensor is a CMOS imaging sensor.

* * * * *